US009555754B2

(12) United States Patent
Hara

(10) Patent No.: US 9,555,754 B2
(45) Date of Patent: Jan. 31, 2017

(54) VEHICLE BODY FRONT PORTION STRUCTURE

(71) Applicant: TOYOTA JIDOSHA KABUSHIKI KAISHA, Toyota-shi (JP)

(72) Inventor: Yasuhiro Hara, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/652,337

(22) PCT Filed: Jan. 17, 2014

(86) PCT No.: PCT/JP2014/050839
§ 371 (c)(1),
(2) Date: Jun. 15, 2015

(87) PCT Pub. No.: WO2014/112596
PCT Pub. Date: Jul. 24, 2014

(65) Prior Publication Data
US 2015/0329144 A1 Nov. 19, 2015

(30) Foreign Application Priority Data
Jan. 18, 2013 (JP) .................................. 2013-007137

(51) Int. Cl.
*B62D 21/15* (2006.01)
*B62D 25/08* (2006.01)
(Continued)

(52) U.S. Cl.
CPC ............... *B60R 19/24* (2013.01); *B60R 19/34* (2013.01); *B62D 21/152* (2013.01); *B62D 25/082* (2013.01); *B60R 2019/247* (2013.01)

(58) Field of Classification Search
CPC ...... B62D 21/15; B62D 21/152; B62D 21/082; B60R 19/24; B60R 19/34; B60R 2019/247
(Continued)

(56) References Cited

U.S. PATENT DOCUMENTS 6,318,775 B1   11/2001   Heatherington et al.
8,544,589 B1 * 10/2013   Rupp ................... B62D 21/152
                                                             180/274
(Continued)

FOREIGN PATENT DOCUMENTS

JP   S62-97066 U   6/1987
JP   H10-203411 A   8/1998
(Continued)

OTHER PUBLICATIONS

International Search Report issued Feb. 10, 2014, in PCT/JP2014/050839, filed Jan. 17, 2014.
(Continued)

*Primary Examiner* — Gregory Blankenship
(74) *Attorney, Agent, or Firm* — Oblon, McClelland, Maier & Neustadt, L.L.P.

(57) ABSTRACT

The vehicle body front portion structure includes a pair of framework members, a bumper framework portion and spacer members. The framework members are long in a vehicle front-and-rear direction and are arranged side by side in a vehicle width direction. Front end sides of the framework members are energy-absorbing portions. The bumper framework portion is long in the vehicle width direction and spans between the front ends of the pair of framework members. The bumper framework portion includes protruding portion that protrudes to vehicle width direction outer sides relative to the framework members. Each spacer member includes a first portion extending from
(Continued)

a front end portion and a second portion curving inward in the vehicle width direction from the first portion.

10 Claims, 6 Drawing Sheets

(51) Int. Cl.
*B60R 19/24* (2006.01)
*B60R 19/34* (2006.01)

(58) Field of Classification Search
USPC ..... 296/187.1, 187.09, 203.02; 293/132, 133
See application file for complete search history.

(56) References Cited

U.S. PATENT DOCUMENTS

| | | | | |
|---|---|---|---|---|
| 8,991,903 | B1* | 3/2015 | Alavandi | B60R 19/04 |
| | | | | 293/133 |
| 9,073,503 | B2* | 7/2015 | Ookubo | B62D 21/152 |
| 9,102,358 | B2* | 8/2015 | Basappa | B62D 25/082 |
| 9,156,418 | B2* | 10/2015 | Ramoutar | B60R 19/24 |
| 2003/0090099 | A1 | 5/2003 | Miyasaka | |
| 2003/0141712 | A1 | 7/2003 | Miyasaka | |
| 2004/0195862 | A1 | 10/2004 | Saeki | |
| 2004/0200659 | A1 | 10/2004 | Miyasaka | |
| 2008/0023972 | A1 | 1/2008 | Ohno et al. | |
| 2011/0049916 | A1 | 3/2011 | Nakanishi | |
| 2013/0147233 | A1 | 6/2013 | Miyashita | |
| 2013/0320709 | A1 | 12/2013 | Kuwabara et al. | |
| 2013/0320710 | A1* | 12/2013 | Watanabe | B62D 25/082 |
| | | | | 296/187.09 |
| 2014/0008923 | A1* | 1/2014 | Han | B60R 19/18 |
| | | | | 293/126 |
| 2014/0091585 | A1* | 4/2014 | Ramoutar | B60R 19/24 |
| | | | | 293/133 |
| 2014/0091595 | A1* | 4/2014 | Ramoutar | B60R 19/24 |
| | | | | 296/187.09 |
| 2014/0327254 | A1 | 11/2014 | Miyashita | |
| 2014/0361559 | A1* | 12/2014 | Sakakibara | B60R 19/34 |
| | | | | 293/133 |
| 2014/0361561 | A1* | 12/2014 | Kuriyama | B60R 19/34 |
| | | | | 293/133 |
| 2015/0021936 | A1* | 1/2015 | Nusier | B62D 21/152 |
| | | | | 293/114 |
| 2015/0076847 | A1 | 3/2015 | Mori | |
| 2015/0102635 | A1* | 4/2015 | Barbat | B60R 19/16 |
| | | | | 296/187.1 |
| 2015/0115633 | A1* | 4/2015 | Braunbeck | B60R 19/04 |
| | | | | 293/132 |
| 2015/0115653 | A1 | 4/2015 | Ookubo et al. | |
| 2015/0137556 | A1* | 5/2015 | Alavandi | B62D 25/08 |
| | | | | 296/187.1 |
| 2015/0145282 | A1* | 5/2015 | Basappa | B62D 25/082 |
| | | | | 296/187.1 |
| 2015/0251702 | A1* | 9/2015 | Volz | B62D 21/152 |
| | | | | 296/187.1 |
| 2015/0274209 | A1* | 10/2015 | Basappa | B60R 19/26 |
| | | | | 180/271 |
| 2015/0298634 | A1* | 10/2015 | Hara | B60R 19/34 |
| | | | | 293/133 |
| 2015/0314742 | A1* | 11/2015 | Kato | B62D 21/152 |
| | | | | 293/155 |
| 2015/0329144 | A1* | 11/2015 | Hara | B62D 21/152 |
| | | | | 296/187.09 |
| 2015/0336525 | A1* | 11/2015 | Nam | B62D 25/082 |
| | | | | 296/187.1 |
| 2015/0375789 | A1* | 12/2015 | Kitakata | B62D 21/152 |
| | | | | 296/187.1 |

FOREIGN PATENT DOCUMENTS

| | | |
|---|---|---|
| JP | 2000-052898 A | 2/2000 |
| JP | 2001-088633 A | 4/2001 |
| JP | 2002-249079 A | 9/2002 |
| JP | 2003-146246 A | 5/2003 |
| JP | 2003-182643 A | 7/2003 |
| JP | 2003-226266 A | 8/2003 |
| JP | 2004-066932 A | 3/2004 |
| JP | 2005-119537 A | 5/2005 |
| JP | 2006-175988 A | 7/2006 |
| JP | 2006-224728 A | 8/2006 |
| JP | 2008-030629 A | 2/2008 |
| JP | 2008-213739 A | 9/2008 |
| JP | 2008-222037 A | 9/2008 |
| JP | 2009-248603 A | 10/2009 |
| JP | 2010-132018 A | 6/2010 |
| JP | 2011-051473 A | 3/2011 |
| JP | 2012-228907 A | 11/2012 |
| JP | 2013-123957 A | 6/2013 |
| JP | 2013-203320 A | 10/2013 |
| JP | 2013-233820 A | 11/2013 |
| JP | 2014-113894 A | 6/2014 |
| JP | WO 2013-172132 A1 | 1/2016 |
| WO | WO 2013-157122 | 10/2013 |

OTHER PUBLICATIONS

Notice of Allowance issued Aug. 31, 2016 in U.S. Appl. No. 14/649,705, filed Jun. 4, 2015.

* cited by examiner

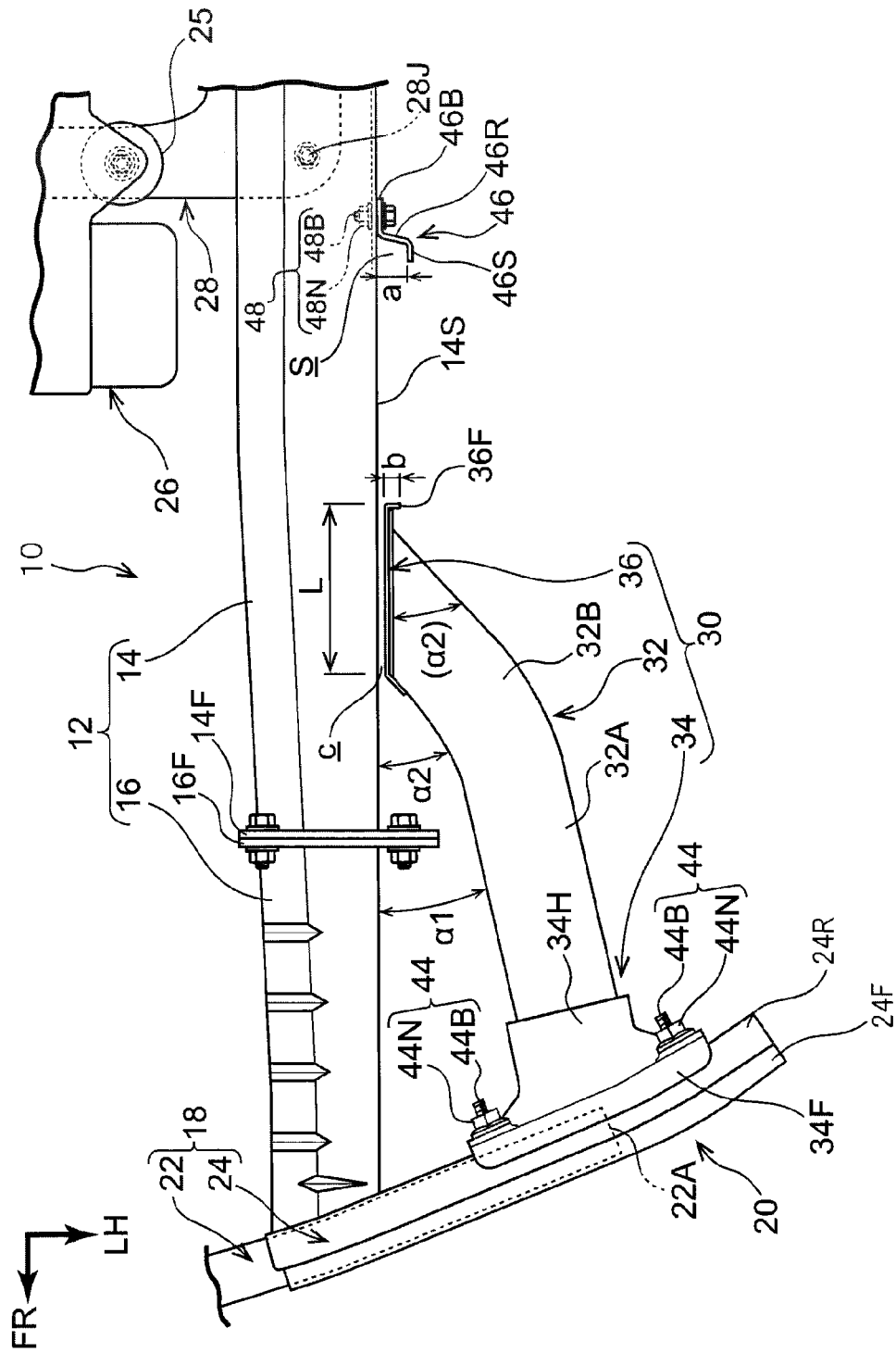

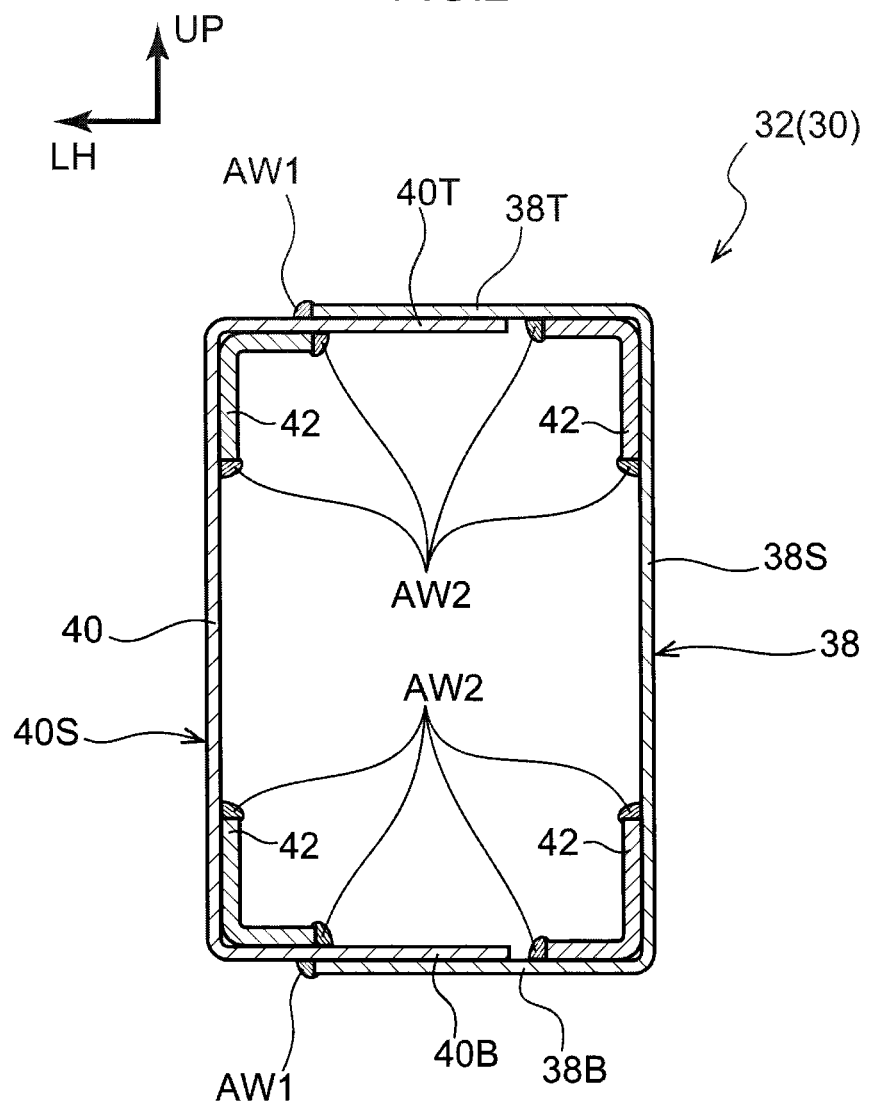

VEHICLE BODY FRONT PORTION STRUCTURE

TECHNICAL FIELD

The present invention relates to a vehicle body front portion structure.

BACKGROUND ART

A structure is known (for example, see Japanese Patent Application Laid-Open (JP-A) No. 2008-213739) that includes: a second protrusion portion provided at a rear face side of a bumper beam; and a first protrusion portion that extends to the vehicle width direction outer side from a side face of a side frame, the first protrusion portion and second protrusion portion interfering when there is an impact of a pole to the outer side of the side frame.

SUMMARY OF INVENTION

Technical Problem

There is scope for improvement with regard to efficiently transmitting an impact load to a framework member that extends in the front-and-rear direction of a vehicle body in a micro-wrap collision, which is a situation in which there is a collision to the vehicle width direction outer side relative to the framework member.

An object of the present invention is to provide a vehicle body front portion structure that may efficiently transmit a load caused by a micro-wrap collision to a framework member.

Solution to Problem

A vehicle body front portion structure according to a first aspect of the present invention includes: a pair of framework members that are long in a vehicle front-and-rear direction and arranged side by side in a vehicle width direction, vehicle front-and-rear direction front end sides of the framework members being energy-absorbing portions; a bumper framework portion that is long in the vehicle width direction and spans between vehicle front-and-rear direction front ends of the pair of framework members, the bumper framework portion including a protruding portion that protrudes to a vehicle width direction outer side relative to the framework members; and a spacer member including a first portion, a vehicle front-and-rear direction front end portion of which is fixed to the protruding portion, the first portion extending from the vehicle front-and-rear direction front end portion toward the framework member in the vehicle front-and-rear direction and the vehicle width direction in a plan view, and a second portion that curves inward in the vehicle width direction from the first portion, a vehicle width direction inner end portion of the second portion opposing a wall portion of the framework member that is oriented to the vehicle width direction outer side.

According to the aspect described above, an impact load inputted to the protruding portion of the bumper framework portion is transmitted to the framework member via the spacer member. Because the vehicle width direction inner end portion of the second portion of the spacer member opposes the vehicle width direction outward face (hereinafter referred to as "the outer face") of the framework member, the spacer member slides against the outer face of the framework member in accordance with deformation of the energy-absorbing portion. After the energy absorption by the energy-absorbing portion, the spacer member transmits the load to a specified region of the framework member.

In this case, because the spacer member is formed with the second portion that is curved inward in the vehicle width direction from the rear end side of the first portion, a transmission efficiency of an impact of a load inward in the vehicle width direction (a lateral force) to the specified region of the framework member is high. Therefore, the specified region to which this load is transmitted is likely to be a starting point for yielding of the framework member. Thus, the load may be efficiently transmitted to the framework member and to a vehicle-mounted component that interferes with the framework member.

Thus, in the vehicle body front portion structure of the aspect described above, a load caused by a micro-wrap collision may be efficiently transmitted to a framework member.

The aspect described above may be configured as a structure in which a vehicle front-and-rear direction rear end portion of the second portion of the spacer member is formed in an acute angle shape in plan view, a vehicle width direction dimension of which steadily decreases to rearward in the vehicle front-and-rear direction.

According to the aspect described above, the rear end portion of the spacer member that is formed in the acute angle shape in plan view digs into the framework member and causes yielding of the framework member. Thus, the spacer member may efficiently transmit a load to the specified region of the framework member in a state in which mispositioning of the spacer member relative to the aforementioned specified region is prevented or effectively suppressed, compared to a structure in which the rear end of a spacer member does not have an acute angle shape.

The aspect described above may be configured as a structure that further includes a rear stopper that limits relative displacement of the spacer member, relative to the framework member, to the rearward in the vehicle front-and-rear direction beyond an energy absorption stroke according to the energy-absorbing portion.

According to the aspect described above, when the energy-absorbing portion of the framework member has deformed to an energy absorption limit, the spacer member interferes with the rear stopper, and further sliding of the spacer member relative to the framework member is effectively limited by the stopper. Thus, the rear end portion of the spacer member that is formed in the acute angle shape is more likely to dig into the specified region, which is an appropriate location (an intended position for the start of yielding), of the framework member.

A vehicle body front portion structure according to a second aspect of the present invention includes: a pair of framework members that are long in a vehicle front-and-rear direction and arranged side by side in a vehicle width direction, vehicle front-and-rear direction front end sides of the framework members being energy-absorbing portions; a bumper framework portion that is long in the vehicle width direction and spans between the vehicle front-and-rear direction front ends of the pair of framework members, the bumper framework portion including a protruding portion that protrudes to a vehicle width direction outer side relative to the framework members; a spacer member, a vehicle front-and-rear direction front end side of which is fixed to the protruding portion, a vehicle front-and-rear direction rear end side of which opposes a wall portion of the framework member that is oriented to the vehicle width direction outer side, a shape in plan view of a vehicle front-and-rear direction rear end portion of which is formed in an acute angle shape, and a vehicle width direction dimension of which steadily decreases to rearward in the vehicle front-and-rear direction; and a rear stopper that limits relative displacement of the spacer member, relative to the framework member, to the rearward in the vehicle front-and-rear direction beyond an energy absorption stroke according to the energy-absorbing portion.

According to the aspect described above, an impact load inputted to the protruding portion of the bumper framework portion is transmitted to the framework member via the spacer member. Because the vehicle width direction inner end portion of the second portion of the spacer member opposes the vehicle width direction outward face (hereinafter referred to as "the outer face") of the framework member, the spacer member slides against the outer face of the framework member in accordance with deformation of the energy-absorbing portion.

After the energy absorption by the energy-absorbing portion, the spacer member interferes with the rear stopper and further sliding relative to the framework member is limited. Therefore, the impact load is efficiently transmitted to the framework member via the spacer member in the form of a load in the width direction (a lateral force). Further, because the rear end of the spacer member is formed in the acute angle shape in plan view, in the state in which sliding of the spacer member relative to the framework member is limited, the acute angle shape portion digs into the framework member and causes yielding of the framework member. Thus, yielding of the framework member is expedited compared to a structure in which the rear end of a spacer member does not have an acute angle shape.

Thus, in the vehicle body front portion structure of the aspect described above, a load caused by a micro-wrap collision may be efficiently transmitted to a framework member.

The aspects described above may be configured as a structure in which a vehicle width direction dimension of the rear stopper is greater than a vehicle width direction dimension of the vehicle front-and-rear direction rear end of the spacer member.

According to the aspect described above, the spacer member may be prevented or effectively suppressed from passing over the stopper and moving rearward.

The aspect described above may be configured as a structure that further includes a side stopper that extends forward in the vehicle front-and-rear direction from a vehicle width direction outer end side of the rear stopper, and that limits relative displacement of a vehicle front-and-rear direction rear end portion of a second portion of the spacer member to the vehicle width direction outer side.

According to the aspect described above, the spacer member may be prevented or even more effectively suppressed from passing over the stopper and moving rearward.

The aspects described above may be configured as a structure in which the rear stopper includes a guide shape that guides the vehicle front-and-rear direction rear end portion of the spacer member toward the side thereof at which the framework member is disposed.

According to the aspect described above, because the guide shape guides the rear end of the spacer member to the framework member side thereof, the rear end portion of the spacer member digging into the framework member is expedited. This helps to expedite yielding of the framework member compared to a case in which the rear end of a framework member does not abut against the framework member.

The aspects described above may be configured as a structure in which the rear stopper protrudes outward in the vehicle width direction from a vehicle front-and-rear direction front end of a base portion that is fixed to the wall portion of the framework member, and the rear stopper is supported by a connecting wall that connects the rear stopper with the base portion.

According to the aspect described above, a stopper main body of the rear stopper interferes with the rear end of the spacer member while the load is transmitted from the spacer member to the framework member. Because the stopper main body is supported at the rearward and the vehicle width direction inner side by the connecting wall, the load may be even more efficiently transmitted from the spacer member to the framework member.

Advantageous Effects of Invention

The vehicle body front portion structure according to the present invention as described hereabove has an excellent effect in that a load caused by a micro-wrap collision may be efficiently transmitted to a framework member.

BRIEF DESCRIPTION OF DRAWINGS

FIG. 1 is a plan view showing principal portions of a vehicle body front portion structure in accordance with a first exemplary embodiment.

FIG. 2 is a sectional diagram taken along line 2-2 of FIG. 1.

DESCRIPTION OF EMBODIMENTS

Figure 3A:
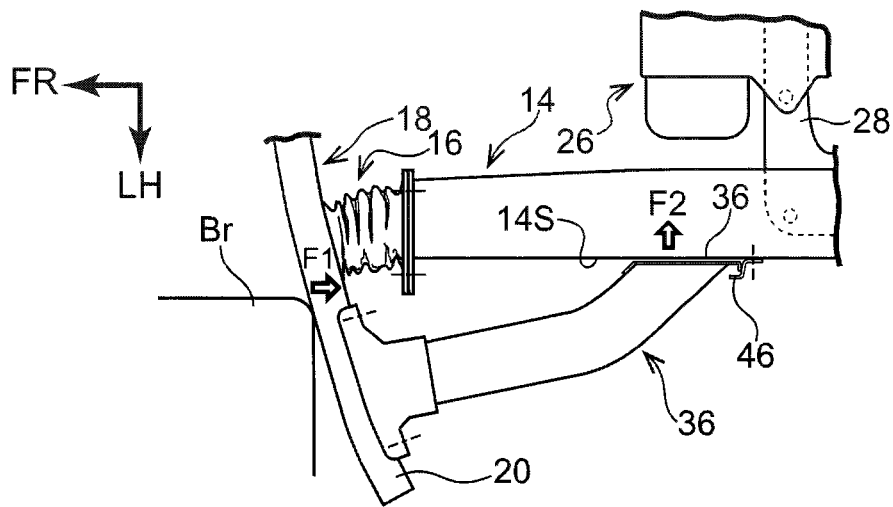
FIG. 3A is a view showing an action of the vehicle body front portion structure in accordance with the first exemplary embodiment when a micro-wrap collision occurs, and is a plan view showing a state at the start of a limiting of movement of a spacer member by a stopper.

A vehicle body front portion structure 10 according to exemplary embodiments of the present invention is described in accordance with the drawings. The vehicle body front portion structure 10 has a structure that is basically symmetrical (with left-and-right symmetry) about a vehicle width direction center line of a vehicle body of an automobile in which the vehicle body front portion structure 10 is employed. Accordingly, the structure at one side of the vehicle width direction (the left side) is described hereinbelow and no description is given of the structure at the other side (the right side). The arrow FR, arrow UP and arrow LH that are shown where appropriate in the drawings represent, respectively, a forward direction, an upward direction and a leftward direction of the automobile in which the vehicle body front portion structure 10 is employed. Herebelow, where descriptions are given simply using the directions front, rear, up, down, left and right, unless otherwise specified, these represent the front and rear in the vehicle front-and-rear direction, up and down in the vehicle up-and-down direction, and left and right when facing forward.

=General Structure of the Automobile=

FIG. 1 shows principal portions of the vehicle body front portion structure 10 in a plan view. As illustrated in FIG. 1, the vehicle body front portion structure 10 includes framework members 12, which are long in the front-and-rear direction. The framework members 12 are provided in a pair at left and right. The pair of framework members 12 are arranged side by side in the vehicle width direction (the framework member 12 at the right side is not shown in the drawings). Each framework member 12 is structured with principal portions thereof being a front side member 14 and a crush box 16, which is disposed at the front end of the front side member 14. Although not shown in the drawings, a rear portion of the front side member 14 reaches past the lower side of a dashboard panel to beneath the floor of a vehicle cabin.

Each front side member 14 is formed with a closed cross section structure (not shown in the drawings) in a sectional view crossing the length direction thereof (the front-and-rear direction). Similarly, each crush box 16 is formed with a closed cross section structure in a sectional view crossing the length direction thereof (the front-and-rear direction). A flange 16F formed at the rear end of the crush box 16 is joined by fastening with nuts and bolts to a flange 14F that is formed at the front end of the corresponding front side member 14. In this exemplary embodiment, the flanges 14F and 16F protrude up and down and to the vehicle width direction outer side from the front side member 14 and the crush box 16.

The crush box 16 is structured to be compressively deformed (crushed) by a load in the front-and-rear direction more easily than the front side member 14. Therefore, when the framework member 12 is subjected to a load from a bumper reinforcement 18, which is described below, the crush box 16 is compressively deformed first. In this exemplary embodiment, the crush boxes 16 are energy-absorbing portions of the framework members 12, corresponding to energy-absorbing portions of the present invention.

The bumper reinforcement 18, which serves as a bumper framework portion, spans between the front ends of the left and right crush boxes 16. The bumper reinforcement 18 is a framework member that is long in the vehicle width direction, and is formed with a closed cross section structure in a sectional view crossing the length direction thereof. Two length direction end portions of the bumper reinforcement 18 are formed as protruding portions 20 that protrude to the vehicle width direction outer sides relative to the respective framework members 12. In this exemplary embodiment, the bumper reinforcement 18 is structured with principal portions thereof being a reinforcement main body 22, which serves as a bumper framework main body, and extensions 24, which structure the protruding portions 20.

Although not shown in the drawings, the reinforcement main body 22 is structured as a closed cross section structure by extrusion-molding or the like of aluminium or an aluminium alloy. In this exemplary embodiment, the cross-sectional shape of the reinforcement main body 22 is a shape in which three rectangular frames are stacked above and below one another.

Each extension 24 is formed in a tubular shape, and is joined to the reinforcement main body 22 in a state in which the extension 24 covers the respective length direction end portion of the reinforcement main body 22. In this exemplary embodiment, a vehicle width direction inner side portion of the extension 24 is fastened to both the crush box 16 and the reinforcement main body 22, and a vehicle width direction inner side portion of the extension 24 is fastened to both a slide spacer 30, which is described below, and the reinforcement main body 22.

In this state, the extension 24 protrudes to the vehicle width direction outer side relative to a vehicle width direction outer end 22A of the reinforcement main body 22. Therefore, the extension 24 may be regarded as being an extension member that extends the bumper reinforcement 18 in the vehicle width direction further than the reinforcement main body 22. The extension 24 structures both the length direction end portion of the reinforcement main body 22 and part of the protruding portion 20.

Each extension 24 is structured by a steel member. That is, the extension 24 is constituted of a material with a higher strength (yield value) than the material constituting the reinforcement main body 22 (which is aluminium or the like). In this exemplary embodiment, the extension 24 is formed in the tube shape as mentioned above (as a closed cross section structure) by a front panel 24F and a rear panel 24R being joined together.

In the vehicle body front portion structure 10, power units 26 are disposed between the left and right front side members 14. In this exemplary embodiment, the power unit 26 is resiliently supported at suspension members 28 via mount members 25. Attached portions 28J of the suspension members 28 are attached to front-and-rear direction central portions of the front side members 14.

=The Slide Spacer=

The vehicle body front portion structure 10 with the basic structure described above is provided with the slide spacers 30, which serve as spacer members. Each slide spacer 30 is disposed so as to occupy a space between the protruding portion 20 of the bumper reinforcement 18 and the framework member 12. In this exemplary embodiment, the slide spacer 30 is provided at the protruding portion 20 and functions as a load transmission member that converts a load to rearward inputted to the protruding portion 20 to a load inward in the vehicle width direction and transmits this load to a front end vicinity of the front side member 14.

In the descriptions below, the load inward in the vehicle width direction that has been converted by the slide spacer 30 may be referred to as "the lateral force". In this exemplary embodiment, the slide spacer 30 is formed as a structure that has a higher bending strength and compression (shear) strength than the bending strength of the front side member 14. Therefore, the slide spacer 30 is a structure that undergoes hardly any compression or bending at all itself but deforms the front side member 14 with the lateral force and transmits the lateral force to the power unit 26. This is specifically described below.

The slide spacer 30 is structured with principal portions thereof being a spacer main body 32, a fixed portion 34, which is fixed to the protruding portion 20, and a slide plate 36, which opposes a side face of the front side member 14 and is spaced apart therefrom by a gap C. In the slide spacer 30 according to this exemplary embodiment, the spacer main body 32, the fixed portion 34 and the slide plate 36 are integrally structured (unified).

—The Spacer Main Body—

The spacer main body 32 includes a first angled portion 32A and a second angled portion 32B. The first angled portion 32A is angled in a plan view such that the rear end side thereof is closer to the front side member 14 than the front end side. The second angled portion 32B is curved toward the side at which the front side member 14 is disposed (inward in the vehicle width direction) from the rear end of the first angled portion 32A. The first angled portion 32A is angled at an inclination angle α1 from the front-and-rear direction, so as to extend toward the front side member 14 in both the front-and-rear direction and the vehicle width direction in plan view. The second angled portion 32B is angled at an inclination angle α2 relative to the front-and-rear direction that is greater than the inclination angle α1 of the first angled portion 32A (α2>α1). Thus, the second angled portion 32B may be regarded as a shape in which the degree to which the rear end side thereof is closer to the front side member 14 than the front end side is greater. In this exemplary embodiment, the boundary between the first angled portion 32A and the second angled portion 32B is formed in a smoothly inflecting shape.

The front end of the first angled portion 32A is joined to the fixed portion 34. The rear end of the second angled portion 32B is joined to the slide plate 36. As described above, the slide plate 36 opposes an outer side wall 14S of the front side member 14, which serves as a wall portion that is oriented to the vehicle width direction outer side. A vehicle width direction dimension of a rear end portion of the second angled portion 32B steadily decreases to rearward, forming an acute angle in plan view (see angle α2 in FIG. 1). In specific terms, the rear end portion of the second angled portion 32B is formed in an acute angle shape that corresponds to the angle formed between the second angled portion 32B, which is formed at an inclination angle as described above, and the outer side wall 14S (i.e., the inclination angle α2 mentioned above).

According to the above descriptions, the spacer main body 32 overall is formed in a shape in which the first angled portion 32A and the second angled portion 32B are connected so as to form an obtuse angle in plan view. In this exemplary embodiment, the first angled portion 32A extends to rearward of the flanges 14F and 16F of the framework member 12. Thus, the spacer main body 32 may be regarded overall as a shape that is inflected (curved) so as to pass around the flanges 14F and 16F.

Further, the spacer main body 32 is formed in a closed cross section shape as shown in FIG. 2. Specifically, the spacer main body 32 is formed into a substantially rectangular closed cross section shape by an inner panel 38 and an outer panel 40 being joined. The cross-sectional shape of each of the inner panel 38 and the outer panel 40 is a substantial "U" shape that opens toward the side thereof at which the other is disposed. Top walls 38T and 40T of the inner panel 38 and outer panel 40 are superposed above and below one another, bottom walls 38B and 40B of the inner panel 38 and outer panel 40 are superposed above and below one another, and the top walls 38T and 40T and bottom walls 38B and 40B, respectively, are joined by arc welding along the length direction thereof. In this exemplary embodiment, the inner panel 38 and outer panel 40 are joined by continuous or non-continuous arc welding along substantially the whole length of the spacer main body 32. Locations of this arc welding are indicated with the symbol AW1 in FIG. 2.

The spacer main body 32 is reinforced against bending and compression by reinforcing members 42 that are provided at each of the four corners of the inside of the closed cross section. Each reinforcing member 42 is formed in a substantial "L" shape in a sectional view crossing the length direction of the slide spacer 30. The reinforcing members 42 are joined to the inner panel 38 and the outer panel 40 by arc welding.

Specifically, at the inner panel 38 side, an upper side reinforcing member 42 is joined to the top wall 38T and a side wall 38S, and a lower side reinforcing member 42 is joined to the bottom wall 38B and the side wall 38S. At the outer panel 40 side, an upper side reinforcing member 42 is joined to the top wall 40T and a side wall 40S, and a lower side reinforcing member 42 is joined to the bottom wall 40B and the side wall 40S. Arc welding locations used for this joining are indicated with the symbol AW2 in FIG. 2. Although not shown in the drawings, each reinforcing member 42 is provided along substantially the whole length of a reinforced portion of the spacer main body 32; the reinforcing members 42 are joined to the inner panel 38 and the outer panel 40 by arc welding continuously or non-continuously along substantially the whole length.

According to the structure described hereabove, each slide spacer 30 is structured with a higher bending strength and compression (shear) strength than the bending strength of the front side member 14, as mentioned above.

—The Fixed Portion—

As shown in FIG. 1, the fixed portion 34 forms a joining portion for retaining the slide spacer 30 provided at the front end of the first angled portion 32A of the spacer main body 32 at the protruding portion 20. The fixed portion 34 includes a main body joining portion 34H, which is joined to the spacer main body 32, and a flange 34F, which is fixed to the protruding portion 20.

The main body joining portion 34H is formed in a tube shape that fits onto the front end of the first angled portion 32A from the outer side thereof. In this fitted state, the main body joining portion 34H is joined to the spacer main body 32 by a fastening, a weld structure or the like, which is not shown in the drawings. The flange 34F protrudes to both sides in the vehicle width direction from the main body joining portion 34H. These protruding portions of the flange 34F are fixed by fastening to the protruding portion 20 with fastenings 44 that include bolts 44B and nuts 44N.

In this exemplary embodiment, this fastening is implemented by the fastenings 44 at a total of four locations that are separated in the vehicle width direction and separated up and down. The fastenings 44 at the vehicle width direction inner side fasten both the reinforcement main body 22 and the extension 24 to the flange 34F. The fastenings 44 at the vehicle width direction inner side fasten only the extension 24 to the flange 34F.

The slide spacer 30 is fixed to (retained at) the protruding portion 20 of the bumper reinforcement 18 by the fixed portion 34 described hereabove. A portion including the fixed portion 34 and the first angled portion 32A of the spacer main body 32 corresponds to a first portion of the spacer member of the present invention.

—The Slide Plate—

As shown in FIG. 1, the slide plate 36 is formed in a plate shape that is oriented to the vehicle width direction inner side. The rear end of the second angled portion 32B of the spacer main body 32 is joined to the slide plate 36 by arc welding, spot welding or the like. In this joined state, the slide plate 36 both closes off the rear end (an opening end) of the second angled portion 32B and protrudes to the front and rear from the rear end of the second angled portion 32B.

A length in the front-and-rear direction of a portion of the slide plate 36 that opposes the outer side wall 14S with the gap C therebetween is represented by the symbol "L". The length L of the slide plate 36 is specified such that a load that is transmitted through the spacer main body 32 from the protruding portion of the bumper reinforcement 18 is transmitted to a large area of the outer side wall 14S of the front side member 14. To be specific, the length L of the slide plate 36 is specified such that, during compression of the crush box 16, the load from the protruding portion 20 is transmitted to the outer side wall 14S while the slide plate 36 slides against the outer side wall 14S (such that local deformation of the outer side wall 14S does not occur).

The rear end of the slide plate 36 is formed as an inflected portion 36F that is inflected outward in the vehicle width direction. A dimension of the inflected portion 36F in the vehicle width direction is represented by the symbol "b". The above-mentioned gap C is formed between the rear end of the slide plate 36 and the vehicle width direction inner side of the slide plate 36, that is, the outer side wall 14S. In this exemplary embodiment, the slide plate 36, that is, the slide spacer 30 is not restrained with respect to the front side member 14.

According to the above description, the slide spacer 30 is a structure that slides along the outer side wall 14S of the front side member 14 in accordance with compressive deformation of the crush box 16. That is, the structure in which the slide plate 36 opposes the front side member 14 in the unrestrained state, along with the above-mentioned length L of the slide plate 36 and the structure of the spacer main body 32 that passes around the flanges 14F and 16F of the framework member 12, constitutes a structure that allows sliding.

A portion including the slide plate 36 and the second angled portion 32B of the spacer main body 32 corresponds to a second portion of the spacer member of the present invention.

=Stopper=

The vehicle body front portion structure 10 further includes stoppers 46 that limit movements of the slide spacers 30 to rearward. In this exemplary embodiment, each stopper 46 is provided at the front side member 14. The stopper 46 limits sliding of the slide spacer 30 relative to the outer side wall 14S of the front side member 14 beyond a predetermined range. This is specifically described below.

Of the stopper 46, a base portion 46B, a rear stopper 46R and a side stopper 46S are integrally formed by bending of a plate member. The base portion 46B is fixed to the outer side wall 14S. The rear stopper 46R extends from the base portion 46B to the vehicle width direction outer side in plan view. The side stopper 46S extends forward from the vehicle width direction outer end of the rear stopper 46R. The base portion 46B is fixed to a portion of the outer side wall 14S that is disposed to sideward of the power unit 26, by fasteners 48 that include bolts 48B and nuts 48N. In this exemplary embodiment, the base portion 46B is fixed to the outer side wall 14S by the fasteners 48 at plural locations that are separated in the up-and-down direction.

The rear stopper 46R extends to the vehicle width direction outer side in plan view from the front end of the base portion 46B. Thus, the stopper 46 opens forward with a space S between the outer side wall 14S and the side stopper 46S, which is not occupied by the fasteners 48. An opening width a of this space S is made larger than the dimension b of the inflected portion 36F of the slide plate 36 structuring the slide spacer 30. Therefore, when the rear end of the slide spacer 30, which ingresses into the space S while sliding along the surface of the outer side wall 14S, abuts against the rear stopper 46R, further sliding of the slide spacer 30 to rearward is limited by the stopper 46.

The rear stopper 46R is slightly angled relative to the vehicle width direction such that the vehicle width direction inner end thereof is disposed to rearward relative to the outer end. This angled shape may be regarded as a guide shape that guides the rear end of the slide spacer 30 abutting against the rear stopper 46R toward the side thereof at which the outer side wall 14S is disposed. A stroke length until the rear end of the slide spacer 30 abuts against the rear stopper 46R is equivalent to an energy absorption stroke length of the crush box 16. Therefore, when the crush box 16 is compressively deformed to the energy absorption limit thereof, the rear end of the slide spacer 30 abuts against the rear stopper 46R and further sliding of the slide spacer 30 is limited.

The side stopper 46S is a structure that inhibits movement to the vehicle width direction outer side by the rear end of the slide spacer 30 that has ingressed into the space S. That is, the side stopper 46S prevents the state in which sliding is limited by the rear stopper 46R from being disengaged.

=Operation=

Now, operation of the first exemplary embodiment is described.

Figure 3B:
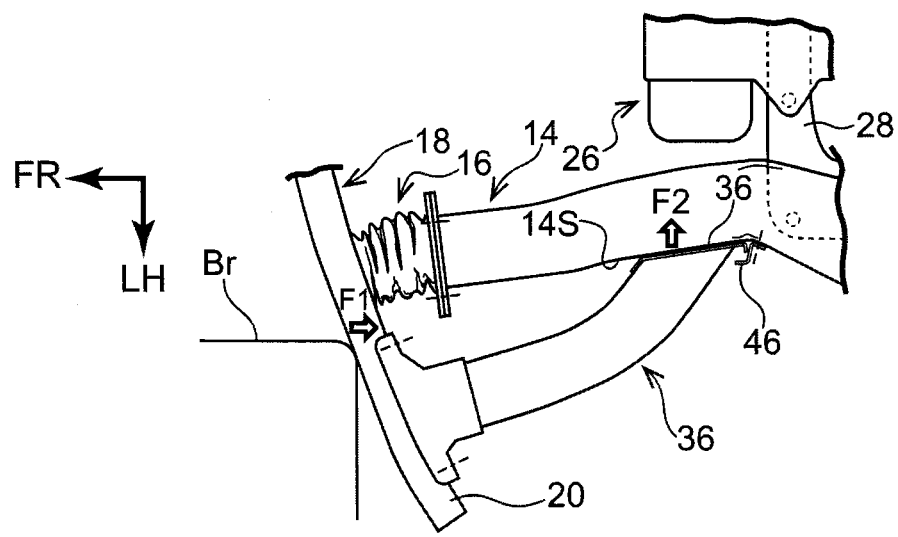
FIG. 3B is a view showing the action of the vehicle body front portion structure in accordance with the first exemplary embodiment when the micro-wrap collision occurs, and is a plan view showing a state at the start of yielding of a front side member.
Figure 3C:
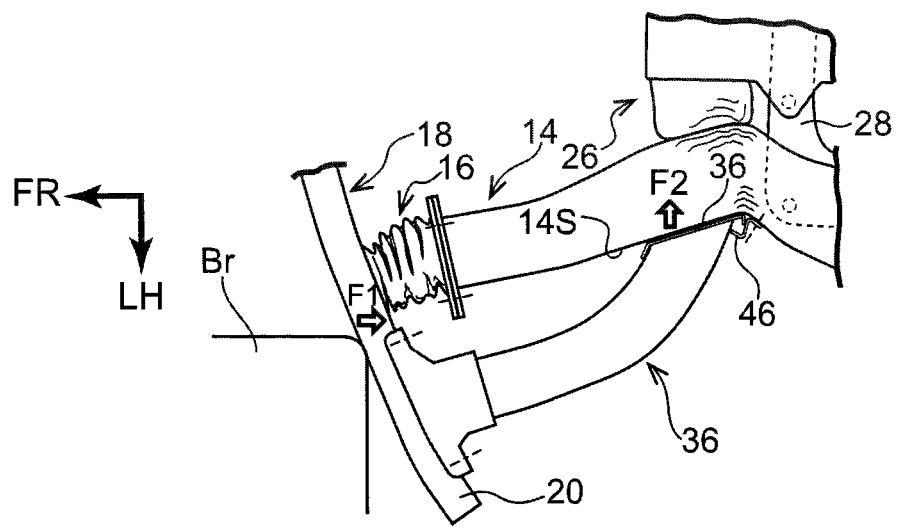
FIG. 3C is a view showing the action of the vehicle body front portion structure in accordance with the first exemplary embodiment when the micro-wrap collision occurs, and is a plan view showing a state of interference between the front side member and a power unit.

Operations when a micro-wrap collision occurs, which is a collision in a state in which a collision object (a barrier Br) at the vehicle width direction outer side relative to the front side member 14 collides with the automobile in which the vehicle body front portion structure 10 according to the structure described above is employed, are described while referring to FIG. 3A to FIG. 3C. The illustrated example shows a case in which the barrier Br collides at the vehicle width direction outer side of the front side member 14 at the left side.

When the micro-wrap collision occurs at the automobile in which the vehicle body front portion structure 10 according to the structure described above is employed, an impact load to rearward is inputted to the protruding portion 20. If bending of the protruding portion 20 (the bumper reinforcement 18) is caused by this impact load, the slide plate 36 of the slide spacer 30 abuts against the outer side wall 14S of the front side member 14. As a result, a portion of the load inputted to the protruding portion 20 is transmitted via the slide spacer 30 to the front side member 14 (a first load transmission state).

That is, the bumper reinforcement 18 is supported at the protruding portion 20 from rearward by the slide spacer 30 and front side member 14. Thus, yielding of the bumper reinforcement 18 at the portion that is fixed to the crush box 16 is prevented or effectively suppressed. Therefore, another portion of the load that is inputted to the protruding portion 20 is transmitted to the crush box 16 at the collision side. Thus, the crush box 16 is compressively deformed as illustrated in FIG. 3A. Thus, an initial energy absorption of the micro-wrap collision is implemented.

During the compressive deformation of the crush box 16, the slide plate 36 of the slide spacer 30 slides against (moves rearward while touching) the front side member 14, while transmitting the load to the front side member 14. The portion of the front side member 14 that is receiving the load moves rearward as an amount of compression of the crush box 16 increases. Thus, the front side member 14 implements a function of guiding the slide spacer 30 rearward without yielding.

When the crush box 16 has been compressively deformed to an energy absorption limit thereof, as shown in FIG. 3A, the sliding of the slide spacer 30 relative to the front side member 14 is limited by the stopper 46. Hence, the impact load that continues to be inputted to the protruding portion 20 (see arrow F1) is inputted as the lateral force (see arrow F2), which has been converted by the slide spacer 30 to a load inward in the vehicle width direction, to a specified region of the front side member 14 (a second load transmission state).

As a result, as illustrated in FIG. 3B, the front side member 14 yields inward in the vehicle width direction. As the yielding of the front side member 14 progresses, as illustrated in FIG. 3C, the front side member 14 interferes with the power unit 26. Thus, the load from the slide spacer 30 is transmitted via the front side member 14 to the power unit 26 (a structure in the engine compartment and the like).

Thus, the impact load that is inputted to the protruding portion 20 is transmitted through the power unit 26 and support structures of the power unit 26 or the like to rearward in the vehicle body and to the opposite side from the collision side (is transmitted to vehicle body portions in the form of a load Fx in the front-and-rear direction and a load Fy in the vehicle width direction (a lateral force)). Thus, a large local deformation of a collision side end portion of the vehicle body by the micro-wrap collision can be prevented or effectively suppressed. Moreover, if the power unit 26 is a (single) mass concentration portion of the automobile and the body of the automobile is moved toward the opposite side from the collision side thereof by a lateral force (an inertial force) inputted to the power unit 26, the input of the impact load to the protruding portion 20 can itself be eliminated or moderated. As a result, a large local deformation of the collision side end portion of the vehicle body is prevented or effectively suppressed.

Herein, each slide spacer 30 is formed in an inflected (curved) shape in which the inclination angle α2 of the second angled portion 32B is larger than the inclination angle α1 of the first angled portion 32A. Therefore, at the slide spacer 30, the efficiency of transmission of the lateral force to the front side member 14 is higher than in a comparative example that is equipped with a spacer main body with a constant inclination angle of α1.

Thus, in the vehicle body front portion structure 10 according to the first exemplary embodiment, a load caused by a micro-wrap collision may be efficiently transmitted to the front side member 14.

Moreover, because of this inflected shape, a front-to-rear length of the slide spacer 30 may be kept short. Therefore, interference between the slide spacer 30 and the vehicle body (for example, a wheel housing), other mounting components or the like can be suppressed by the sliding of the slide spacer 30 within the range of the energy absorption stroke of the crush box 16. That is, freedom of design of the vehicle body is greater than in a comparative example that is equipped with a slide spacer with a constant inclination angle of α1 (i.e., a longer front-to-rear length).

In the vehicle body front portion structure 10, the rear end of the slide spacer 30 is formed in the acute angle shape in plan view. Therefore, the rear end portion of the slide spacer 30 digs into the front side member 14 while the slide spacer 30 causes yielding of the front side member 14. Thus, mispositioning (slipping) of the slide spacer 30 relative to the front side member 14 is effectively suppressed, and yielding of the front side member 14 is expedited by the slide spacer 30 concentratedly transmitting the lateral force to the specified region of the front side member 14.

In the vehicle body front portion structure 10, when the crush box 16 has been compressively deformed to the energy absorption limit thereof, the rear end of the slide spacer 30 interferes with the rear stopper 46R of the stopper 46. In a comparative example in which, for example, the stopper 46 is not provided, there would be concern that, after the crush box had compressively deformed to the energy absorption limit thereof, sliding of the slide spacer 30 relative to the front side member 14 would continue in a mode in which the angle formed between the slide spacer 30 and the protruding portion 20 increases. Such continuation of the sliding might be an impediment to yielding of the front side member 14 at the appropriate location.

In the vehicle body front portion structure 10, by contrast, this sliding relative to the front side member 14 in the mode in which the angle formed between the slide spacer 30 and the protruding portion 20 widens is prevented or effectively suppressed and limited by the stopper 46. Therefore, the front side member 14 yields effectively at the appropriate location, which contributes to dispersal of the load into the vehicle body as described above and efficient transmission of the load to the power unit 26.

Accordingly, in the vehicle body front portion structure 10, a load caused by a micro-wrap collision may be efficiently transmitted to a framework member.

Further, the vehicle width direction dimension a of the stopper 46 (to be precise, the width of the opening of the space S formed by the stopper 46 and the outer side wall 14S) is larger than the dimension b of the inflected portion 36F formed at the rear end of the slide spacer 30. Therefore, the slide spacer 30 that has slid against (moved while touching) the outer side wall 14S is prevented or effectively suppressed from passing over the stopper 46 and moving rearward thereof.

In particular, because the opening width a of the space S is larger than the dimension b of the inflected portion 36F, the rear end of the slide spacer 30 enters into the space S, and the slide spacer 30 is prevented or effectively suppressed from passing over the stopper 46 and moving rearward thereof. That is, the side stopper 46S that defines the space S with the outer side wall 14S suppresses mispositioning of the slide spacer 30 in the vehicle width direction relative to the front side member 14. Therefore, the effect of sliding of the slide spacer 30 being limited by the stopper 46 is realized to a higher level than in a structure that does not include the side stopper 46S.

The rear stopper 46R of the stopper 46 includes the guide shape that is slightly angled relative to the vehicle width direction such that the vehicle width direction inner end thereof is disposed to the rearward relative to the outer end. This guide shape guides the rear end of the slide spacer 30 to the side thereof at which the outer side wall 14S is disposed. Therefore, the front side member 14 yields in a state in which the rear end of the slide spacer 30 is abutting thereagainst. Thus, yielding of the front side member 14 at the appropriate location is expedited compared to a structure in which the stopper 46 does not include the guide shape.

The bumper reinforcement 18 of the vehicle body front portion structure 10 is structured with the extensions 24 being respectively joined to the two ends of the reinforcement main body 22, the extensions 24 being formed of a material with higher strength than a material that constitutes the reinforcement main body 22. Each extension 24 is provided in a range that reaches from the portion at which the crush box 16 is fixed to the distal end of the bumper reinforcement 18, that is, the protruding portion 20. Therefore, compared to a case in which the bumper reinforcement 18 is constituted of aluminium extrusion-molded components over the whole length thereof, curving deformation (yielding), cross-sectional collapse or the like of the protruding portion 20 is less likely to be caused by a micro-wrap collision. Accordingly, the impact load may be efficiently transmitted from the protruding portion 20 to the front side member 14 via the slide spacer 30.

Second Exemplary Embodiment

Now, a second exemplary embodiment is described with reference to FIG. 4. Structures that are basically the same as structures according to the first exemplary embodiment are assigned the same reference symbols as the structures according to the first exemplary embodiment; these structures may not be described and may not be shown in the drawings.

Figure 4:
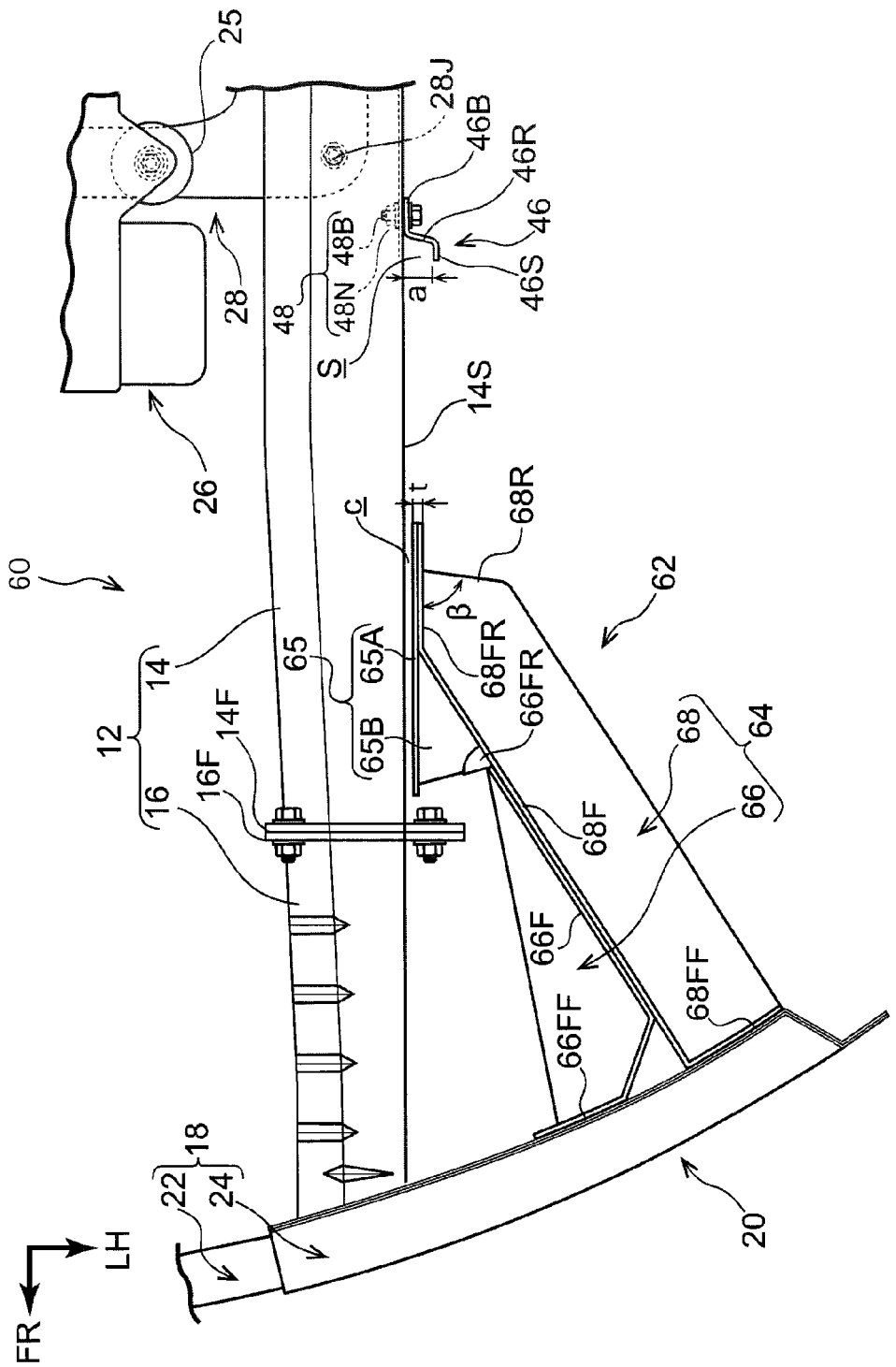
FIG. 4 is a plan view showing principal portions of a vehicle body front portion structure in accordance with a second exemplary embodiment.

FIG. 4 shows principal portions of a vehicle body front portion structure 60 in a plan view. The vehicle body front portion structure 60 has a similar structure to the vehicle body front portion structure 10 according to the first exemplary embodiment, except in that the structure of a slide spacer 62 that serves as the spacer member is different from that of the slide spacer 30. The extension 24 shown in FIG. 4 has a different shape from the extension 24 illustrated in the first exemplary embodiment, but the basic structure is similar to the extension 24 illustrated in the first exemplary embodiment. The vehicle body front portion structure 60 is described in specific terms herebelow.

The slide spacer 62 is structured with principal portions thereof being a spacer main body 64, which is fixed to the extension 24, and a slider portion 65, which is provided at the rear end of the spacer main body 64 and opposes the outer side wall 14S of the front side member 14. The spacer main body 64 is formed into a closed cross section shape (not shown in the drawings), which is a closed cross section in a sectional view taken across the length direction of the spacer main body 64, by an inner panel 66 and an outer panel 68 being joined together.

The outer panel 68 is formed in a hat shape that opens inward in the vehicle width direction in the sectional view. The outer panel 68 includes upper and lower flanges 68F. A front flange 68FF and a rear flange 68FR protrude from a front edge and a rear edge of the outer panel 68. A rear wall 68R is formed at the rear end side of the outer panel 68. The rear wall 68R closes off the closed cross section of the spacer main body 64. An angle β formed between the rear wall 68R and the rear flange 68FR (i.e., a slide plate 65A, which is described below) in plan view is an acute angle.

The inner panel 66 is formed in a hat shape that opens outward in the vehicle width direction in the sectional view. The inner panel 66 includes upper and lower flanges 66F. A vehicle width direction dimension of the inner panel 66 (a depth in sectional view) becomes steadily smaller to rearward. The rear end of the inner panel 66 is formed as a flat plate-shaped rear flange 68FR. A front flange 66FF protrudes from a front edge of the inner panel 66.

The upper and lower flanges 66F and 68F are joined to one another by welding. Thus, the inner panel 66 and outer panel 68 structure the spacer main body 64 with the closed cross section. In this exemplary embodiment, front end portions of the inner panel 66 and the outer panel 68 are separated in the vehicle width direction and unjoined. That is, the spacer main body 64 is formed in a "y" shape as shown in FIG. 19. The spacer main body 64 is joined by welding, at the aforementioned front flanges 66FF and 68FF, to the rear face of the rear panel 24R that structures the extension 24.

The slider portion 65 is structured with principal portions thereof being the slide plate 65A and a projecting portion 65B. The slide plate 65A opposes the outer side wall 14S of the front side member 14 and is spaced apart therefrom by a gap C. The projecting portion 65B projects from the slide plate 65A and fits into the rear end of the spacer main body 64. In the state in which the projecting portion 65B is fitted into the rear end of the spacer main body 64, the projecting portion 65B is joined by welding or the like to the rear flange 66FR of the inner panel 66 and an opening edge portion of the outer panel 68 that opens inward in the vehicle width direction.

The slide spacer 62 described hereabove is formed in an inflected shape overall in plan view, with a rear portion thereof being curved inward in the vehicle width direction relative to the front portion (toward the side thereof at which the outer side wall 14S is disposed). In this exemplary embodiment, the portion that is formed in the "y" shape in plan view, which is structured by the front portion of the outer panel 68 and the inner panel 66, corresponds to the first portion of the spacer member of the present invention. The portion that is formed to curve from the rear end of this portion corresponding to the first portion, by the rear portion of the outer panel 68 and (the projecting portion 65B of) the slider portion 65, corresponds to the second portion of the spacer member of the present invention.

A thickness t of a portion of the slide spacer 62 at which the rear flange 68FR of the outer panel 68 and the slide plate 65A of the slider portion 65 are superposed is smaller than the opening width a of the space S of the stopper 46.

=Operation=

The vehicle body front portion structure 60 with the structure described above may provide basically the same effects by the same operations as the vehicle body front portion structure 10 according to the first exemplary embodiment. Moreover, because the spacer main body 64 of the slide spacer 62 is formed in the "y" shape, loads inputted to a wide range of the protruding portion 20 in the vehicle width direction may be transmitted to the front side member 14.

In the second exemplary embodiment, an example is illustrated in which the spacer main body 64 is formed in the "y" shape, but this is not limiting. For example, a structure is possible in which the inner panel and outer panel are joined as far as the front ends thereof. In this case, a taper shape is formed in which the width of the front end side is wider than the rear end side. Thus, loads inputted to a wide range of the protruding portion 20 in the vehicle width direction may be transmitted to the front side member 14.

=Variant Examples of the Stopper=

Figure 5:
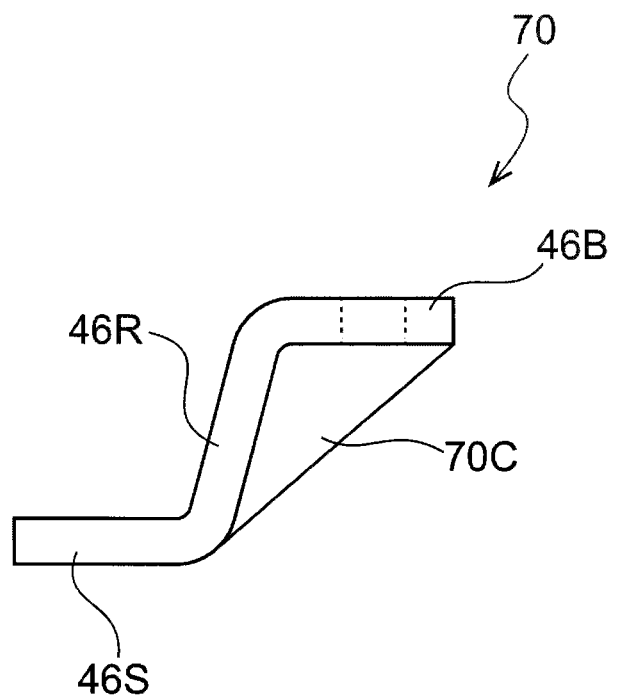
FIG. 5 is a plan view showing a stopper in accordance with a variant example.

In the first and second exemplary embodiments, an example is illustrated that is provided with the stopper 46, but the present invention is not limited thus. For example, a structure that is provided with a stopper 70 as shown in FIG. 5 in place of the stopper 46 is possible.

The stopper 70 is a structure in which a connecting wall 70C is formed at the stopper 46, connecting the base portion 46B with the rear stopper 46R. In this embodiment, the connecting wall 70C is formed in a triangular shape in plan view, two sides of which are the base portion 46B and the rear stopper 46R. This connecting wall 70C may be structured by a separate member being joined by welding or the like, or may be formed integrally during machining (pressing) of the stopper 46. In the latter structure, a pair of the connecting wall 70C are formed, connecting the base portion 46B with the rear stopper 46R at upper and lower ends of the stopper 46.

Further, in the first and second exemplary embodiments, an example is illustrated in which the stopper 46 includes the side stopper 46S, but the present invention is not limited thus. For example, a stopper that does not include the side stopper 46S may be employed in place of the stopper 46.

In the first and second exemplary embodiments, an example is illustrated in which the stopper 46 is provided at the front side member 14, but the present invention is not limited thus. For example, a stopper may be provided at another portion structuring the vehicle body, such as a suspension tower, a stabilizer bracket or the like. As a further example, the stopper (function) may be constituted by (the shape of) the suspension tower itself.

Further yet, in the present invention, the structure in which the slide spacer is formed in the inflected (curved) shape in plan view including the first portion and the second portion as described above is not limited to a structure that is provided with a stopper. Conversely, in the structure that includes the stopper that limits sliding of the slide spacer, the plan view shape of the slide spacer is not limited to the inflected shape described above.

In the first and second exemplary embodiments, an example is illustrated in which the vehicle body front portion structure is structured symmetrically about the vehicle width direction center line, but the present invention is not limited thus. For example, the structures relating to the present invention may be employed only at one side in the vehicle width direction.

In the first and second exemplary embodiments, an example is illustrated that is provided with the bumper reinforcement 18 including the extensions 24, but the present invention is not limited thus. For example, a structure is possible that is provided with a bumper reinforcement that does not include the extensions 24. Further, a structure that is provided with the extensions is not limited to a structure in which the material of the extensions has a higher strength (higher resilience) than the material of the bumper reinforcement.

In the first and second exemplary embodiments, an example is illustrated that is provided with the framework member 12 that is structured by the front side member 14 and the crush box 16 being joined together, but the present invention is not limited thus. For example, a structure is possible that is provided with a front side member that does not include a crush box but in which a front end side is formed as an energy-absorbing portion with a lower compression strength than other portions.

It will be clear that the present invention may be embodied with numerous modifications within a scope that does not deviate from the gist of the present invention.

10 Vehicle body front portion structure
12 Framework member
14 Front side member (framework member)
16 Crush box (energy-absorbing portion of framework member)
18 Bumper reinforcement (bumper framework portion)
20 Protruding portion
30 Slide spacer (spacer member)
32A First angled portion (first portion)
32B Second angled portion (second portion)
34 Fixed portion (first portion)
36 Slide plate (second portion)
46 Stopper
46R Rear stopper
46S Side stopper
60 Vehicle body front portion structure
62 Slide spacer (spacer member)
70 Stopper
70C Connecting wall

The invention claimed is:

1. A vehicle body front portion structure comprising:
a pair of framework members that are long in a vehicle front-and-rear direction and arranged side by side in a vehicle width direction, vehicle front-and-rear direction front end sides of the framework members being energy-absorbing portions;
a bumper framework portion that is long in the vehicle width direction and spans between the vehicle front-and-rear direction front ends of the pair of framework members, the bumper framework portion including a protruding portion that protrudes to a vehicle width direction outer side relative to the framework members;
a spacer member,
a vehicle front-and-rear direction front end side of which is fixed to the protruding portion,
a vehicle front-and-rear direction rear end side of which is a slide plate which opposes a wall portion of the framework member that is oriented to the vehicle width direction outer side and which is spaced apart from the wall portion by a gap,
a shape in plan view of a vehicle front-and-rear direction rear end portion of which is formed in an acute angle shape, and
a vehicle width direction dimension of which steadily decreases to rearward in the vehicle front-and-rear direction; and
a rear stopper that limits relative displacement of the spacer member, relative to the framework member, to the rearward in the vehicle front-and-rear direction beyond an energy absorption stroke according to the energy-absorbing portion.

2. The vehicle body front portion structure according to claim 1, wherein a vehicle width direction dimension of the rear stopper is greater than a vehicle width direction dimension of the vehicle front-and-rear direction rear end of the spacer member.

3. The vehicle body front portion structure according to claim 2, further comprising a side stopper that extends forward in the vehicle front-and-rear direction from a vehicle width direction outer end side of the rear stopper, and that limits relative displacement of a vehicle front-and-rear direction rear end portion of the second portion of the spacer member to the vehicle width direction outer side.

4. The vehicle body front portion structure according to claim 1, wherein the rear stopper includes a guide shape that guides the vehicle front-and-rear direction rear end portion of the spacer member toward the side thereof at which the framework member is disposed.

5. The vehicle body front portion structure according to claim 1, wherein the rear stopper protrudes outward in the vehicle width direction from a vehicle front-and-rear direction front end of a base portion that is fixed to the wall portion of the framework member, and the rear stopper is supported by a connecting wall that connects the rear stopper with the base portion.

6. A vehicle body front portion structure comprising:
a pair of framework members that are long in a vehicle front-and-rear direction and arranged side by side in a vehicle width direction, vehicle front-and-rear direction front end sides of the framework members being energy-absorbing portions;
a bumper framework portion that is long in the vehicle width direction and spans between vehicle front-and-rear direction front ends of the pair of framework members, the bumper framework portion including a protruding portion that protrudes to a vehicle width direction outer side relative to the framework members;

a spacer member including a first portion, a vehicle front-and-rear direction front end portion of which is fixed to the protruding portion, the first portion extending from the vehicle front-and-rear direction front end portion toward the framework member in the vehicle front-and-rear direction and the vehicle width direction in a plan view, and a second portion that curves inward in the vehicle width direction from the first portion, a slide plate which is formed in a vehicle width direction inner end portion of the second portion opposing a wall portion of the framework member that is oriented to the vehicle width direction outer side and being spaced apart from the wall portion by a gap, and a vehicle front-and-rear direction rear end portion of the second portion of the spacer member is formed in an acute angle shape in plan view, a vehicle width direction dimension of which steadily decreases to rearward in the vehicle front-and-rear direction; and a rear stopper that limits relative displacement of the spacer member, relative to the framework member, to the rearward in the vehicle front-and-rear direction beyond an energy absorption stroke according to the energy-absorbing portion.

7. The vehicle body front portion structure according to claim 6, wherein a vehicle width direction dimension of the rear stopper is greater than a vehicle width direction dimension of the vehicle front-and-rear direction rear end of the spacer member.

8. The vehicle body front portion structure according to claim 7, further comprising a side stopper that extends forward in the vehicle front-and-rear direction from a vehicle width direction outer end side of the rear stopper, and that limits relative displacement of a vehicle front-and-rear direction rear end portion of the second portion of the spacer member to the vehicle width direction outer side.

9. The vehicle body front portion structure according to claim 6, wherein the rear stopper includes a guide shape that guides the vehicle front-and-rear direction rear end portion of the spacer member toward the side thereof at which the framework member is disposed.

10. The vehicle body front portion structure according to claim 6, wherein the rear stopper protrudes outward in the vehicle width direction from a vehicle front-and-rear direction front end of a base portion that is fixed to the wall portion of the framework member, and the rear stopper is supported by a connecting wall that connects the rear stopper with the base portion.

* * * * *